(12) United States Patent
Baugher et al.

(10) Patent No.: US 9,515,875 B2
(45) Date of Patent: Dec. 6, 2016

(54) ZERO TOUCH DEPLOYMENT OF MULTI-TENANT SERVICES IN A HOME NETWORK ENVIRONMENT

(71) Applicant: CISCO TECHNOLOGY, INC., San Jose, CA (US)

(72) Inventors: Mark John Baugher, Portland, OR (US); Plamen Nedeltchev, San Jose, CA (US); Luka Perkov, Zagreb (HR); Tara K. Thimmanaik, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 372 days.

(21) Appl. No.: 14/211,914

(22) Filed: Mar. 14, 2014

(65) Prior Publication Data

US 2015/0263891 A1 Sep. 17, 2015

(51) Int. Cl.
*H04L 12/24* (2006.01)
*H04L 12/28* (2006.01)
*H04L 12/933* (2013.01)

(52) U.S. Cl.
CPC ....... *H04L 41/0806* (2013.01); *H04L 12/2834* (2013.01); *H04L 41/5041* (2013.01); *H04L 49/15* (2013.01); *H04L 41/022* (2013.01)

(58) Field of Classification Search
CPC ............... H04L 41/0806; H04L 49/15; H04L 12/2834; H04L 41/022; H04L 41/5041
See application file for complete search history.

(56) References Cited

U.S. PATENT DOCUMENTS

| | | |
|---|---|---|
| 6,310,878 B1 | 10/2001 | Bodnar et al. |
| 8,125,894 B2 | 2/2012 | Van Den Bosch et al. |
| 8,346,976 B2 * | 1/2013 | Bouthemy et al. ........... 709/250 |
| 2003/0126248 A1 | 7/2003 | Chambers |
| 2013/0339495 A1 * | 12/2013 | Mower et al. ................ 709/220 |

FOREIGN PATENT DOCUMENTS

WO    WO2015/138047    9/2015

OTHER PUBLICATIONS

PCT Apr. 10, 2015 International Search Report and Written Opinion of the International Searching Authority from International Application U.S. Application Serial No. PCT/2015/012275.
Ibanez, Mario, et al., "Virtualization of Virtual Gateways," 2007 Fifth Workshop on Intelligent Solutions in Embedded Systems, Jun. 1, 2007, pp. 115-125.
Yiakoumis, et al., "Slicing Home Networks," HomeNets'11, Aug. 15, 2011, Toronto, Ontario, Canada, © 2011 ACM 978-1-4503-0798-7/11/08, 6 pages; http://yuba.stanford.edu/~nickm/papers/Homenets2011.pdf.

* cited by examiner

*Primary Examiner* — Ayaz Sheikh
*Assistant Examiner* — Debebe Asefa
(74) *Attorney, Agent, or Firm* — Patent Capital Group

(57) ABSTRACT

An example method for zero touch deployment of multi-tenant services in a home network environment is provided and includes receiving router configuration information of a home router located in a home network, the router configuration information including at least one slice setting for a service deployment at the home router, and configuring the slice setting on the home router for the service from a remote network separate from the home network. The slice setting can logically divide the home router to enable separation of the service from other services provisioned and configured on the home router. In specific embodiments, the method further includes receiving a request for the service from a service user entity, sending a slice provisioning request to a router manager for provisioning the service in the home router, and receiving a slice provisioned response comprising the router configuration information from the router manager.

20 Claims, 9 Drawing Sheets

ZERO TOUCH DEPLOYMENT OF MULTI-TENANT SERVICES IN A HOME NETWORK ENVIRONMENT

TECHNICAL FIELD

This disclosure relates in general to the field of communications and, more particularly, to zero touch deployment of multi-tenant services in a home network environment.

BACKGROUND

Home networks have proliferated with the expanding use by consumers of various computing, networked devices. For example, in addition to using computers for e-mail, people use them for schoolwork, shopping, instant messaging, downloading music and videos, and playing games. Other uses of home network include home security, home automation and monitoring, energy management, remote tutoring and healthcare. In addition, people use smart televisions, set-top boxes, smartphones, etc. that can be connected with each other to provide a network within the home. Home networks are getting harder to manage as people connect more devices, use new applications, and rely on them for entertainment, communication, and work. In addition, home users may lack the technical expertise to manage their home network. It can be common for home networks to be poorly managed, insecure and ineffective.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for zero touch deployment of multi-tenant services in a home network environment is provided and includes receiving router configuration information of a home router located in a home network, the router configuration information including at least one slice setting for a service deployment at the home router, and configuring (e.g., preparing, organizing, ordering, aligning, arranging, programming, encoding, etc.) the slice setting on the home router for the service from a remote network separate from the home network. As used herein, a "home network" comprises a local area network that facilitates communication and interoperability among devices present inside or within close proximity of a small geographic area, typically a home (e.g., residential dwelling for an individual, family, household, etc.) or small office (e.g., a store, library, etc. that does not use an enterprise network).

Example Embodiments

Figure 1:
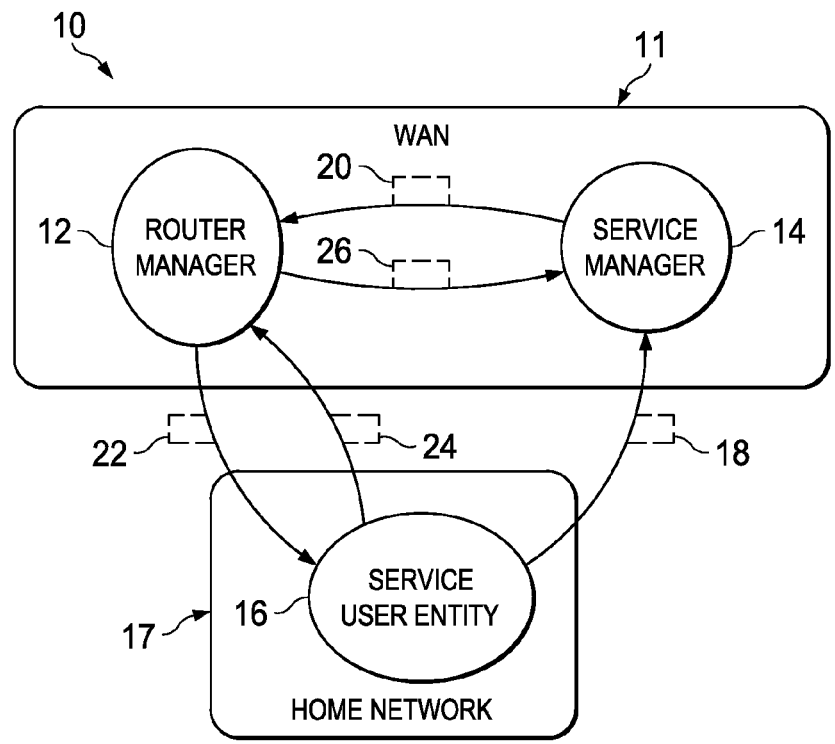
FIG. 1 is a simplified block diagram illustrating a communication system for zero touch deployment of multi-tenant services in a home network environment.

Turning to FIG. 1, FIG. 1 is a simplified block diagram illustrating a communication system 10 for zero touch deployment of multi-tenant services in a home network environment in accordance with one example embodiment. FIG. 1 illustrates a wide area network 11 comprising a router manager 12, and a service manager 14. WAN 11 can comprise one or more access networks, core networks, enterprise networks, cloud networks, etc. within the broad scope of the embodiments. A service user entity 16 located in a home network 17 may communicate with router manager 12, and service manager 14.

In a general sense, service user entity 16 may be co-located with devices in home network 17, and can include smartphones and other mobile devices, computers, printers, scanners, network attached storage, home security systems, televisions, audio players, video game consoles, thermostats, smoke detectors, garage door openers, lighting controls, appliances, etc. Home network 17 can be wired or wireless. Home network 17 may be secured from devices in other networks through appropriate security measures like encryption, password protection, firewalls, network address translation, etc.

Embodiments of communication system 10 can facilitate introducing additional services into home network 17 from additional service providers in addition to the ISP without installing new routers and allowing multiple service managers to manage parts of home network 17 (e.g., for disparate services, such as home security, teleworking or other service). Home network 17 can include, in addition to service user entity 16, a home router (e.g., a customer premises equipment (CPE) router (e.g., routers, switches, residential gateways, set-top boxes, fixed mobile convergence products, home networking adaptors, internet access gateways, etc.) that interconnects various devices in home network 17 and provides connectivity to WAN 11).

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

One of the factors that have historically led to establishment of a home network is inability to share residential Internet access among all internet capable devices in the home. Due to IPv4 address exhaustion, most Internet Service Providers (ISPs) provide only one WAN-facing IP address for each residential subscription. Therefore, most homes require some sort of home router that acts as a liaison capable of network address translation (NAT) of packets travelling across the WAN-home network boundary. Moreover, most small-embedded home network devices require remote configuration from a computer or smartphone on the same network.

Multi-tenancy is well known in commercial data centers where a data center (DC) operator sells a service to a DC customer to run a virtual machine (VM) on a DC server. The DC operator may also offer virtual networking services within the DC to further ensure isolation of the customer's data and traffic. Multi-tenancy may also be useful inside the home network, however, where the home user buys services from multiple providers. The user is a "subscriber" of at least one ISP. The user may also subscribe to home-network services from other providers (vendors) such as home-security, teleworking solutions, video surveillance, connected energy, home health services, and remote tutoring. While it is common today for a provider of a home-network service to use a separate home router for each disparate service, it would be useful to directly offer the services on the router that is already installed and working on the home network and configure the router, bridge or a switch with slices to offer isolation for a service that needs it.

Home networks are typically unmanaged without explicit user provisioning, configuration and management. Many present-day home network services such as teleworking seek to offer the user a "zero-touch deployment" (ZTD) in which the user simply plugs the network device into an electrical outlet and to the home Internet connection; ZTD solutions are often based on the home user plugging in the device and allowing remote automated provisioning, configuration and management from the Enterprise Information Technology (IT) administrators of the service provider. Home networks are typically characterized by being unmanaged, and in need of ZTD, and have routers and network devices owned by a plurality of owners, and therefore in need of supporting services from a variety of providers in addition to one or more Internet Service Providers to the network. In the service provider's ZTD solutions, the home user does not perform any provisioning work; the provisioning work is typically outsourced to a technician through a customer visit or by contract to a third party, or by automatic configuration through a network management protocol such as TR-069. Existing scenarios involve controlling a default configuration of the home gateway and some simple 1-2-3 way of bootstrapping the initial configuration, which later allows the final configuration to be downloaded from a remote server to the home user's gateway (e.g., home router).

Thus, there are two parties involved; there is a single service provider and a single user. A problem arises when an existing service has to be deployed for purposes of new multiple providers who may share routers, switches or overlay networks in the same home. It will be useful to have a solution that allows maintaining uninterrupted services previously subscribed, provisioned and deployed and allowing a new service in a ZTD way. In addition, the home router may be controlled or managed by the ISP, thereby adding complexities to the router-sharing problem. A solution does not exist today to provide deployment and coexistence of the home user, the ISP (e.g., router manager), and one or more service providers that use the home router.

Communication system 10 is configured to offer a system and method for zero touch deployment of multi-tenant services in a home network environment. According to various embodiments, zero touch deployment may be initialized over the network based upon security relationships between a home user of home network 17 as a customer of a tenant service provider (e.g. a web account) and the home user as a subscriber of an ISP (e.g. the ISP signs and installs a digital certificate on the home router). Various embodiments satisfy at least three policy configurations: (1) the ISP accepts the tenant service provider's certificate for secure provisioning, (2) the ISP has a business relationship and sells the tenant service provider's services to the user, or (3) the ISP and the tenant service provider have no relationship at all.

According to embodiments of communication system 10, service manager 14 may receive router configuration information of a home router located in home network 17. The router configuration information may include at least one slice setting for a service deployment at the home router. Service manager 14 may configure the slice setting on the home router for the service from a remote network, namely, WAN 11, separate from home network 17. The slice setting can include at least one network interface on the home router that may be used by the service managed by service manager 14. Note that the slice on the home router interface extends to the home network using network addressing; the service comprises entertainment, home security, or etc. that uses the slice for isolating the service from other services. Configuring the slice setting on the home router for the service can include using the router configuration information to specify parameters for the slices on the home router; adding keys and digital certificates to authenticate the slice/service; and other operations.

In various embodiments, the slice setting can logically divide the home router to enable separation of the service from other services provisioned and configured on the home router. In specific embodiments, a plurality of independent service managers can configure separate slices on the home router for distinct services. As used herein, the term "slice" refers to a split in data path components (e.g., links, input buffers, crossbar, etc.) in the home router. Each slice may logically separate the services on the home router, facilitating remote and disparate management (e.g., by different service managers) of the different services. The "slice setting" refers to settings of the data path components to enable the corresponding slice. A configured slice setting includes values of parameters associated with the data path components to enable the slice to operate for one or more specific services.

For example, the slice setting may refer to a specific network interface (e.g., 802.1X SSID-1) on the home router; configuring the slice setting may include specifying security parameters for facilitating port authentication for the specific service at the 802.1X SSID-1 network interface. In some embodiments, the slice setting may be implemented for a network address, where the structure of the network address can partition home network 17 into sub-networks, and the sub-networks may include network partitions that include addresses on home network 17, names on home network 17, and resources on the home router (e.g., Wi-Fi SSID or Ethernet port). In some embodiments, a slice control plane in the router may orchestrate independent control of each slice. Slices may enable isolation of bandwidth, traffic, control, and modification of services provided through the home router to service user entity 16. For example, a subset of all traffic to the home router that is associated with a specific service may be allocated to a corresponding slice (e.g., by means of the network address prefixes that are allocated by the service manager to the slice). In another example, queues, buffers, etc. may be divided according to the corresponding slices.

According to various embodiments of communication system 10, at least three entities may be involved in remotely provisioning and configuring a service on the home router: router manager 12, service manager 14, and service user entity 16. Service user entity 16 may be associated with the home user who is the subscriber of an ISP (who provides Internet service and manages (e.g., controls, owns, etc.) the home router that hosts a tenant service provider's service) and customer of the tenant service provider (who provides a secondary service such as teleworking, home security, etc. to the home user); router manager 12 may be associated with the home user's ISP; and service manager 14 may be associated with the tenant service provider.

Dynamic provisioning of the tenant service provider's service on home network 17 may involve a three-way identification, authentication and authorization among (1) service user entity 16; (2) service manager 14; and (3) router manager 12. Not all ISPs will have the same policies for hosting tenant services and not all tenant service providers have the same policies for providing services on a customer's home network and ISP home router. Finally, the home user may choose ISP and tenant services based on the personal or household preferences for service privacy. There may be a trade-off between degrees of privacy, isolation and user involvement in the process of remotely provisioning services in home network 17.

For example, in the case of an ISP-managed router, the home user trusts the ISP to host only user-authorized tenant service providers. The tenant service provider trusts the ISP to adhere to a service agreement regarding the tenant service provider's data and traffic, which may be protected using virtual machines and virtual networking technology (e.g., similar to DC environments). The tenant service provider may also ensure that its service is installed on the home network (e.g., 17) of the intended user (e.g., the customer who has requested the service). The home user may ensure that the tenant service provider is the intended business entity from whom the home user has requested services before the tenant service provider establishes the service on the home user's home network 17.

In various embodiments, in an initial state prior to provisioning and configuring the service, home network 17, through the home user, has a pre-existing security association with router manager 12; the security association may be embodied in keys and a digital (e.g., ISP-signed) certificate on the home router in home network 17. In a final state, the tenant service manager's keys and signed digital certificate may be installed on the home router for the slice that belongs to a particular service manager 14.

In a specific embodiment, the ISP and tenant service providers may be partners in business. The home user may identify the service to be provisioned on the home router from the tenant service provider (e.g., through advertisements, store, web site, on-line store, etc.). In some scenarios, the home user may have a pre-existing relationship (e.g., web account) with the tenant service provider. The tenant service provider may cause service manager 14 to provision and configure slice settings allocated by router manager 12 on the home router in home network 17 from WAN 11. In one example embodiment, service manager 14 may receive a request 18 for the service from service user entity 16. Request 18 may include subscriber credentials (e.g., the home user's ISP subscriber identity).

Service manager 14 may send a slice provisioning request 20 to router manager 12 managing the home router for provisioning at least one slice in the home router. Slice provisioning request 20 may include interface descriptors (e.g., to request exclusive use of a Wi-Fi SSID and shared use of the router WAN interface) for the service, service manager credentials, and subscriber credentials (provided in request 18). Router manager 12 may send an authentication and authorization request 22 to service user entity 16, for example, to confirm that the home user has authorized the service to be installed on the home router in home network 17. In some embodiments, authentication and authorization request 22 may be provided in an electronic mail solicitation from the ISP to the home user. Service user entity 16 may send a confirmation message 24, including an authorization or a refusal of authentication and authorization request 22. In some embodiments, confirmation message 24 may be provided in an electronic communication or via telephone (e.g., between home user and ISP representative).

Router manager 12 may report the success or failure to service manager 14 in a slice provisioned response 26 comprising the router configuration information. Router configuration information can include the router domain name system (DNS) name (or Internet Protocol (IP) address) and digital certificate of the home router in home network 17, which the ISP has provisioned according to slice provisioning request 20. Service manager 14 can subsequently securely configure the slice on the home router in home network 17.

Turning to the infrastructure of communication system 10, the network topology of WAN 11 can include any number of servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network, for example, WAN 11.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment of WAN 11 may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network. The example network environment of home network 17 may be configured over a physical infrastructure that may include WLANs (including Bluetooth), and wired LANs.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, router manager 12 comprises an application executing in a suitable network element. As used herein, the term 'network element' is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Service manager 14 may comprise an application executing in a suitable network element controlled by the tenant service provider. Service user entity 16 may comprise any suitable node located in home network 17, inclusive of applications, objects, and devices such as smartphones and other mobile devices, computers, printers, scanners, network attached storage, home security systems, televisions, audio players, video game consoles, thermostats, smoke detectors, garage door openers, lighting controls, appliances, etc.

Embodiments of communication system 10 can enable a marketplace of services in home network 17 by allowing individual providers to manage their services without responsibility for other providers' services or the general home network. Embodiments of communication system 10 can allow network equipment to be shared through a multi-manager or multi-tenant model for routers and devices on the home network. Various embodiments can preserve home-network connectivity across the home network by allowing cooperative, partner relationships, as well as "over-the-top" services.

Figure 2:
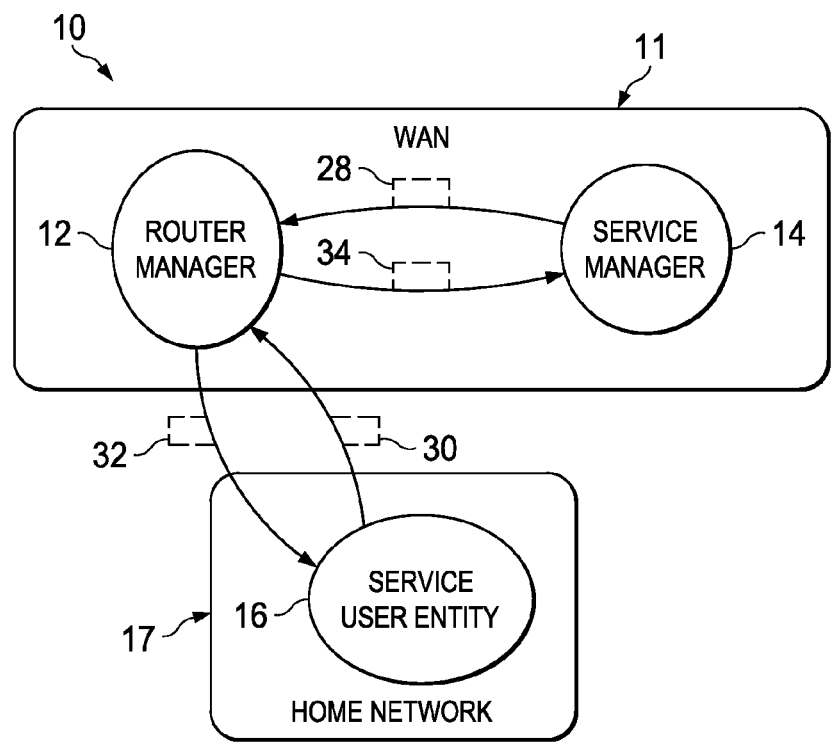
FIG. 2 is a simplified block diagram illustrating another embodiment of the communication system.

Turning to FIG. 2, FIG. 2 is a simplified block diagram illustrating example details of another embodiment of communication system 10. The ISP may operate an 'app store' in WAN 11, offering for sale services of one or more tenant service providers. Router manager 12 may store and/or access a portion of slice provisioning requests for each service from corresponding tenant service providers. Each portion of the slice provisioning request may include interface descriptors (e.g., to request exclusive use of a Wi-Fi SSID and shared use of the router WAN interface) for the service and service manager credentials.

For example, service manager 14 may send the portion of slice provisioning request for a specific service in message 28. Router manager 12 may receive a request 30 from service user entity 16 for the specific service. In various embodiments, the home network's relationship with router manager 12 (e.g., between home user and ISP) may be embodied in keys and a digital certificate on the home router in home network 17. Router manager 12 may combine the portion of the slice provisioning request with subscriber credentials associated with the home user in home network 17 to provision the service on the home router in home network 17 at the time of the sale to the home user using appropriate provisioning communication 32. Subsequently, router manager 12 may send slice provisioned response 34 to service manager 14. Slice provisioned response 34 may include router configuration information, comprising router DNS name (or IP address) and digital certificate. Service manager 14 can configure the ISP-provisioned slice on the home router in home network 17.

Figure 3:
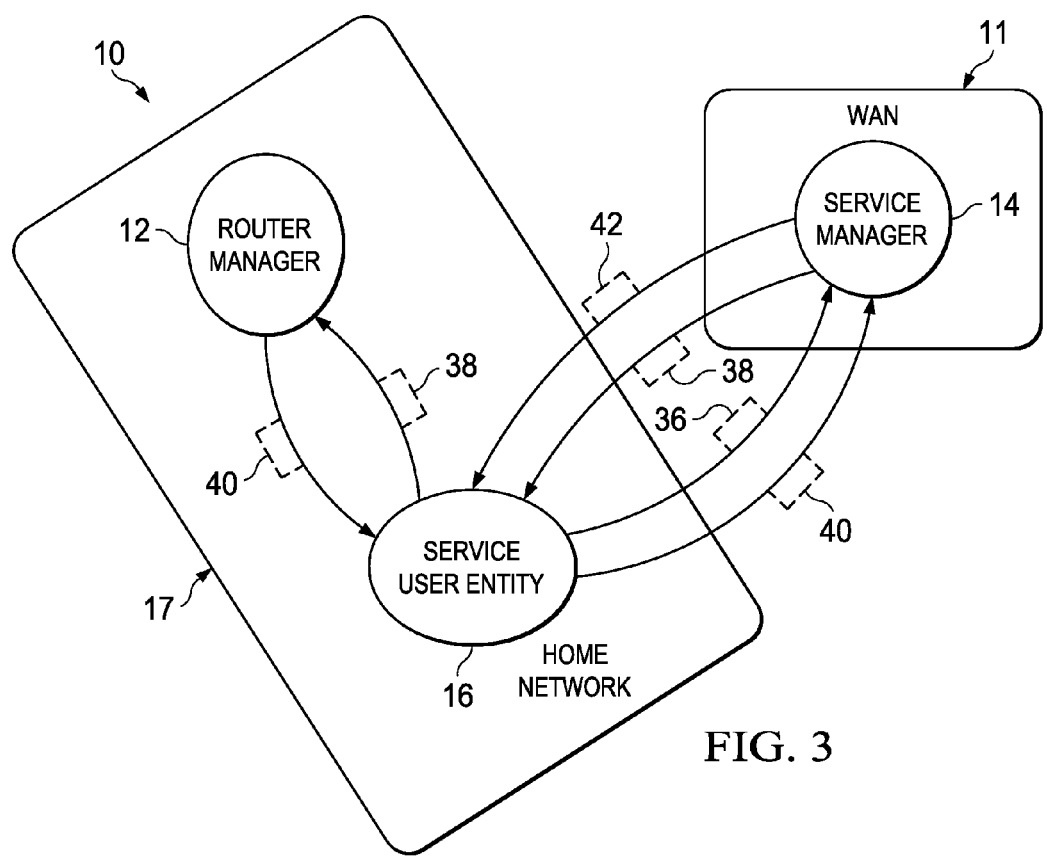
FIG. 3 is a simplified block diagram illustrating yet another embodiment of the communication system.

Turning to FIG. 3, FIG. 3 is a simplified block diagram illustrating yet another embodiment of communication system 10. The ISP and tenant service providers may have no relationship and little knowledge of each other but the home user can liaison between them, requesting the ISP to provision the home router for the tenant service provider, who then configures the home router without any ISP participation or visibility. The ISP may allow the home user to install the service when the ISP has no prior relationship to the tenant service provider. For example, the scenario could involve so-called "over-the-top" service in which the home user owns and manages the home router in home network 17.

In a general sense, over-the-top content (OTT) refers to delivery of services (e.g., home entertainment, home security, etc.) over the Internet without the ISP being involved in the control or distribution of the service. The ISP may be aware of the contents of the IP packets comprising the service, but is not responsible for, nor able to control, the viewing abilities, copyrights, and/or other redistribution of the content or the services. In entertainment video, for example, OTT is in contrast to purchase or rental (e.g., pay television video on demand or an IPTV video service) of video or audio content from the ISP. OTT includes content that arrives at the home user's display device from a third party, such as NowTV™, Netflix™, etc., leaving the ISP responsible only for transporting the IP packets.

In OTT scenarios, service user entity 16 may interact with a management agent resident on the home router. In various embodiments, router manager 12 may comprise the management agent. Service user entity 16 may directly request the service from service manager 14 through an appropriate message 36. Service manager 14 may send a slice provisioning request 38 in response. Slice provisioning request 38 may include interface descriptors for the service, service manager credentials, and subscriber credentials. Service user entity 16 may forward slice provisioning request 38 to local router manager 12. Router manager 12 may be located in the home router in home network 17. Router manager 12 may send a slice provisioned response 40 to service user entity 16. Slice provisioned response 40 may comprise router configuration information and other information (e.g., related to a network interface), such as router DNS name (or IP address), router digital certificate, etc. to allow service manager 14 to configure the provisioned slice on the home router. Subscriber user entity 16 may forward slice provisioned response 40 to service manager 14. Service manager 14 may configure the slice settings for the service on the home router and send a message 42 notifying of the success or failure of the slice configuration for the service.

Figure 4:
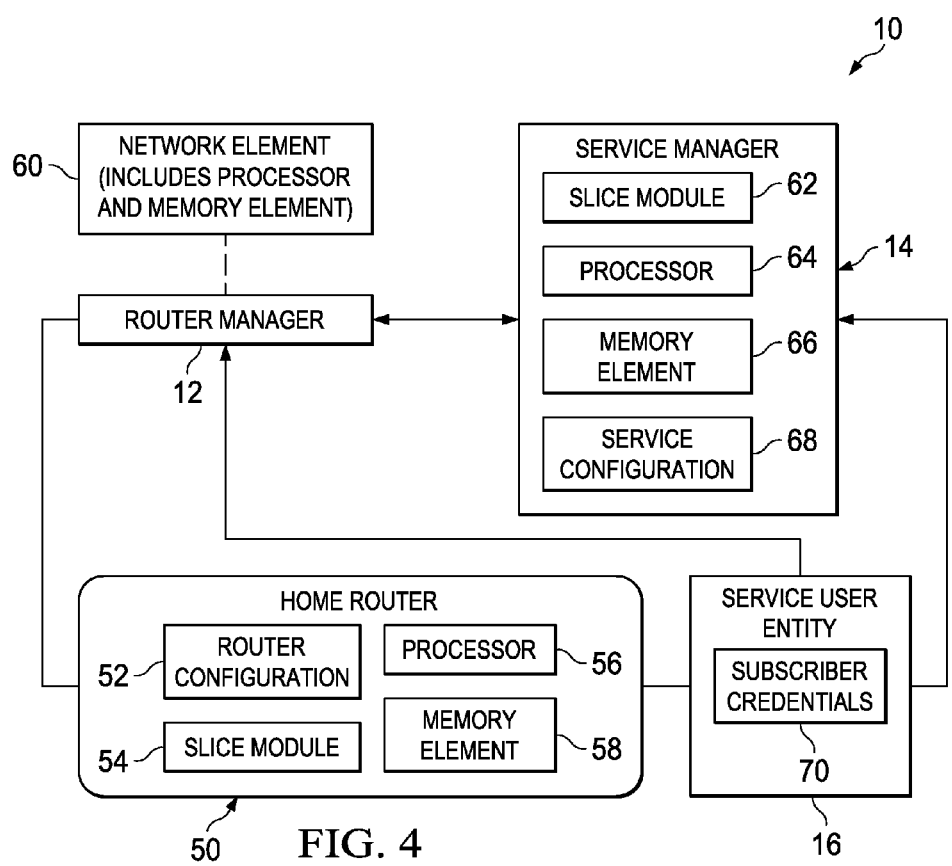
FIG. 4 is a simplified block diagram illustrating example details of embodiments of the communication system.

Turning to FIG. 4, FIG. 4 is a simplified block diagram illustrating example details of an embodiment of communication system 10. In various embodiments, a home router 50 may be located in home network 17, along with service user entity 16. Home router 50 may include a router configuration 52, a slice module 54, a processor 56, and a memory element 58, among numerous other components and interfaces. Processor 56 and memory element 58 may facilitate various operations by home router 50, and service user entity 16. In some embodiments, service user entity 16 may comprise separate processors and memory elements (not shown); in other embodiments, service user entity 16 may use processor 56 and memory element 58 for performing various operations.

Home router 50 may be managed by router manager 12, which can communicate with service user entity 16 and service manager 14. In some embodiments, router manager 12 may be located in WAN 11, for example, executing on a network element 60 (including a processor and a memory element, among other components and interfaces) located in WAN 11; in other embodiments, router manager 12 may execute in home router 50, located in home network 17. Service manager 14 may include a slice module 62, a processor 64, a memory element 66, and a service configuration 68, among numerous other components and interfaces. Service user entity 16 may be associated with subscriber credentials 70, including ISP provided subscriber identity.

Figure 5:
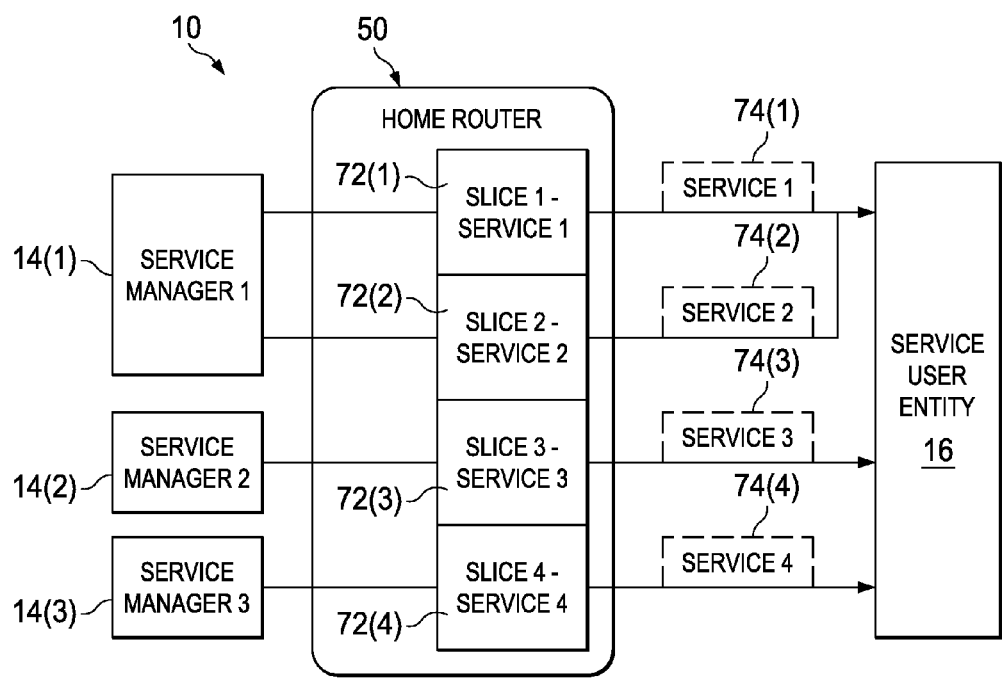
FIG. 5 is a simplified block diagram illustrating other example details of an embodiment of the communication system.

Turning to FIG. 5, FIG. 5 is a simplified block diagram illustrating example details of an embodiment of communication system 10. According to various embodiments, a plurality of independent service managers (e.g., 14(1)-14(3)) can configure (e.g., by example slice module 62 on example service manager 14) separate slices (e.g., 72(1)-72(4)) on home router 50 for distinct services (e.g., 74(1)-74(4)). Services 74(1)-74(4) may be serviced directly or indirectly (e.g., by using a network address provisioned on home network 17 by a corresponding particular slice) on home router 50's network interfaces. Home router 50 may be logically divided (e.g., by slice module 54) into a plurality of slices 72(1)-72(4) provisioned for respective services 74(1)-74(4). Note that in some embodiments, services 74(1)-74(4) may be distinguished by addresses or address prefixes used by various devices comprising service user entity 16. Each slice setting can logically divide home router 50 to enable separation of services provisioned and configured on home router 50. Each slice/service may be managed by one or more service managers (e.g., by slice module 62 on service manager 14). For example, services 74(1) and 74(2), associated with slices 72(1) and 72(2), respectively, may be managed by service manager 14(1). Slices 72(1) and 72(2) may facilitate providing services 74(1) and 74(2), respectively, to service user entity 16. Service 74(3), associated with slice 72(3), may be managed by service manager 14(2); service 74(4), associated with slice 72(4), may be managed by service manager 14(3).

Note that the figure illustrates merely one logical service user entity 16 for ease of illustration. Service user entity 16 may include one or more devices that consume services 74(1)-74(4) on their respective local networks within home network 17. For example, service user entity 16 may include a television and other video devices that consume service 74(1), which may be an over-the-top entertainment service; service user entity 16 may include home security devices, that consume service 74(3); service user entity 16 may include an appliance sensor that consumes service 74(4); and so on. Note that although only four network services are illustrated herein, any number of services may be provided through home router 50 (e.g., through appropriate network slices) within the broad scope of the embodiments.

Figure 6:
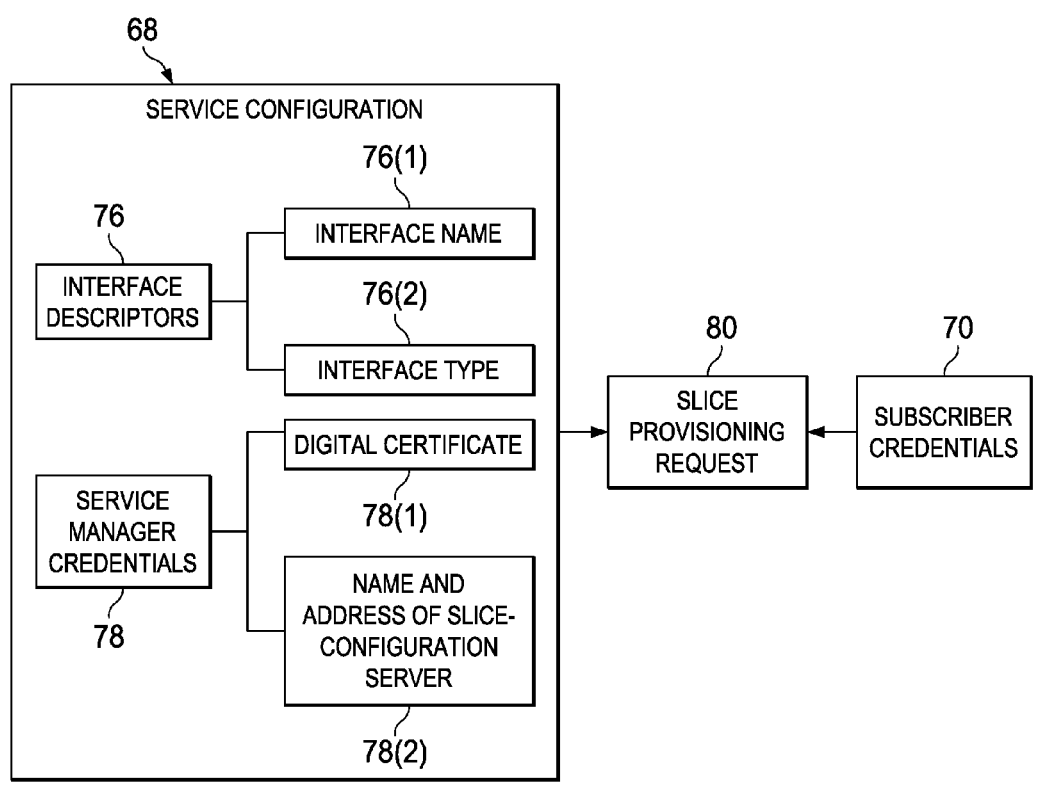
FIG. 6 is a simplified block diagram illustrating yet other example details of an embodiment of the communication system

Turning to FIG. 6, FIG. 6 is a simplified block diagram illustrating example details of an embodiment of communication system 10. In some embodiments, service configuration 68 can include requests for interface descriptors 76, comprising, for example, 76(1) (interface name) and 76(2) (interface type). Service configuration 68 can also include service manager credentials 78, comprising, for example, 78(1) (digital certificate) and 78(2) (DNS name and address of slice configuration server (e.g., server on which slice module 62 executes)). A slice provisioning request 80 may comprise service configuration 68 in some embodiments; in other embodiments, slice provisioning request 80 may further comprise subscriber credentials 70.

Figure 7:
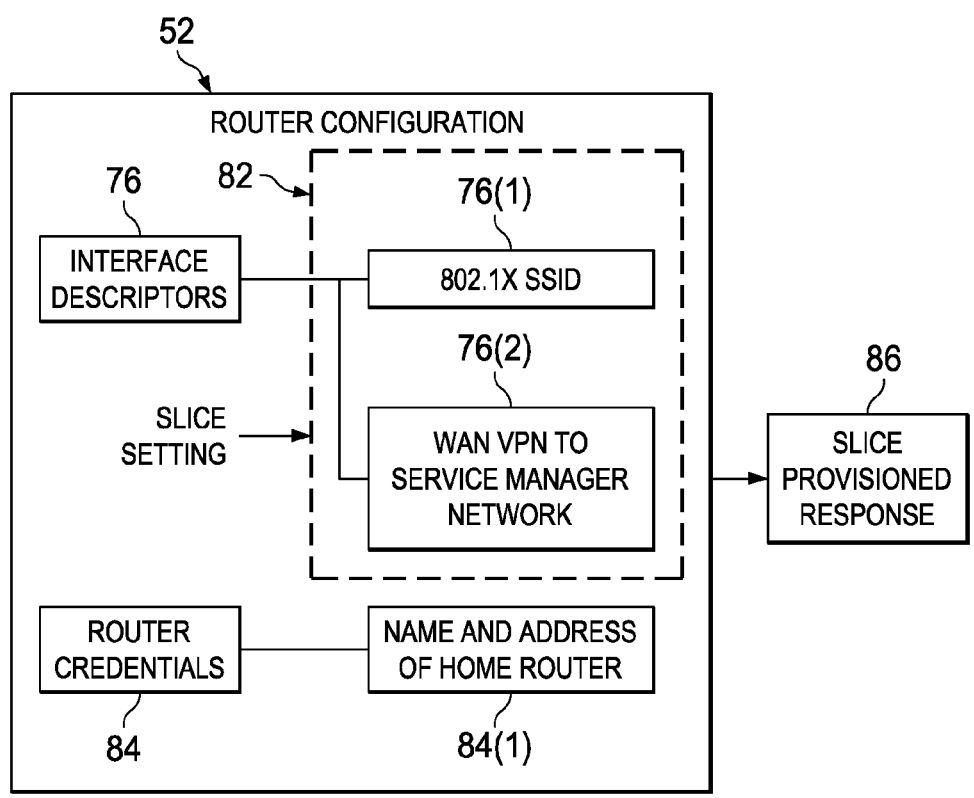
FIG. 7 is a simplified block diagram illustrating yet other example details of an embodiment of the communication system.

Turning to FIG. 7, FIG. 7 is a simplified block diagram illustrating example details of an embodiment of communication system 10. In some embodiments, router configuration 52 can include a list of acceptable interface descriptors 76, comprising, for example, 76(1) (Wi-Fi SSID) and 76(2) (WAN interface). In various embodiments, service manager 14 may configure network interface descriptors 76 at home router 50, for example, running an IEEE 802.1X service on the allocated Wi-Fi SSID, or an IPsec VPN on the allocated WAN interface. The specific interface descriptors 76 requested by service manager and accepted by router manager 12 may constitute slice setting 82, which may be configured at home router 50 (e.g., with Radius, Diameter, or other authorization server and credentials, speed, encryption type, or other network interface parameter) to instantiate the corresponding slice on home router 50. Router configuration 84 can also include router credentials 84, comprising, for example, 84(1) (DNS name and address of home router 50). Router configuration 52 may be included in each slice provisioned response 86.

Figure 8:
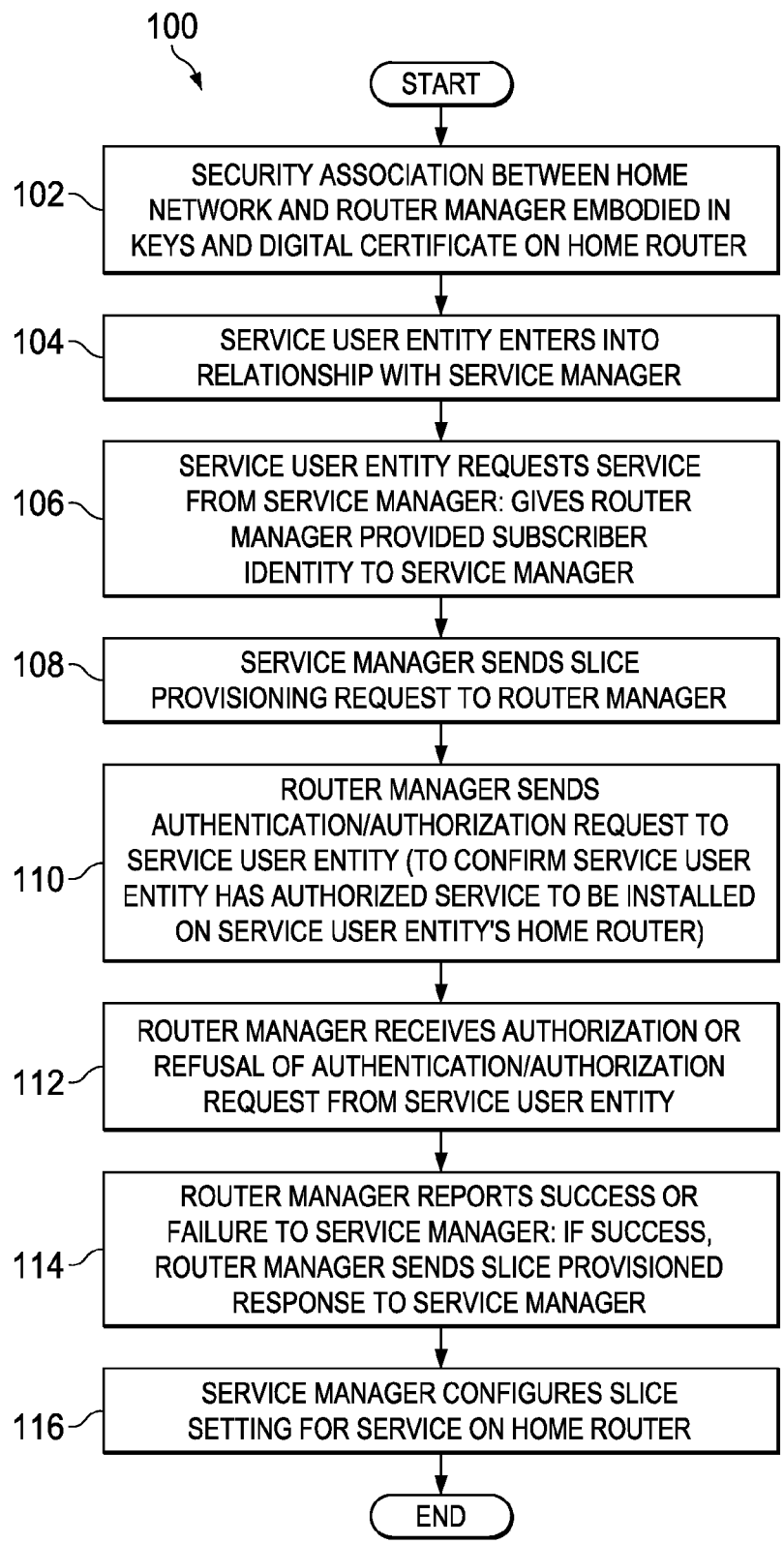
FIG. 8 is a simplified flow diagram illustrating example operations that may be associated with an embodiment of the communication system.

Turning to FIG. 8, FIG. 8 is a simplified flow diagram illustrating example operations 100 that may be associated with embodiments of communication system 10. At 102, home network 17's security association with router manager 12 may be embodied in keys and digital certificate on home router 50. At 104, service user entity 16 may enter into a relationship with service manager 14 (e.g., through a web account). At 106, service user entity 16 may request a specific service from service manager 14 in a request message 18, and give router manager provided subscriber identity to service manager 14. At 108, service manager 14 may send slice provisioning request 20 to router manager 12. At 110, router manager 12 may send authentication and authorization message 22 to service user entity 16, for example, to confirm service user entity 16 has authorized service to be installed on service user entity's home router 50). At 112, router manager 12 may receive confirmation message 24 from service user entity 16 authorizing or rejecting authentication and authorization message 22. At 114, router manager 12 may report success or failure in message 26, including slice provisioned response 86, to service manager 14. At 116, service manager 16 may configure the slice settings for the service on home router 50.

Figure 9:
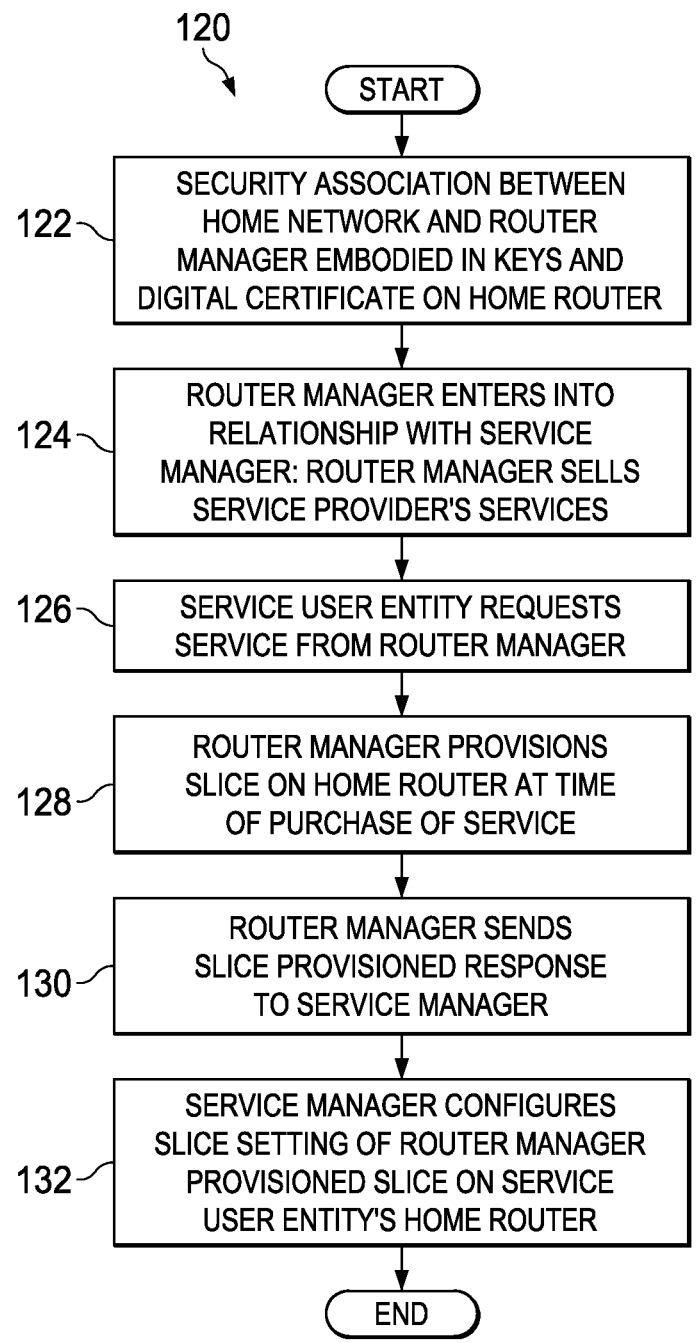
FIG. 9 is a simplified flow diagram illustrating other example operations that may be associated with an embodiment of the communication system.

Turning to FIG. 9, FIG. 9 is a simplified flow diagram illustrating example operations 120 that may be associated with embodiments of communication system 10. At 120, home network 17's security association with router manager 12 may be embodied in keys and digital certificate on home router 50. At 124, router manager 12 may enter into a relationship with service manager 14, selling the associated service provider's services. At 126, service user entity 16 may request a specific service from router manager 12 in message 30. Note that message 30 can include any suitable electronic transaction, including clicking on a web link, sending an electronic mail, sending a fax, effectuating an electronic sale, etc. At 128, router manager 12 may provision a slice on home router 50 at time of purchase. At 130, router manager 12 may send slice provisioned response 86 (including slice settings 82) to service manager in message 34. At 132, service manager 14 may configure the slice settings for the service on home router 50.

Figure 10:
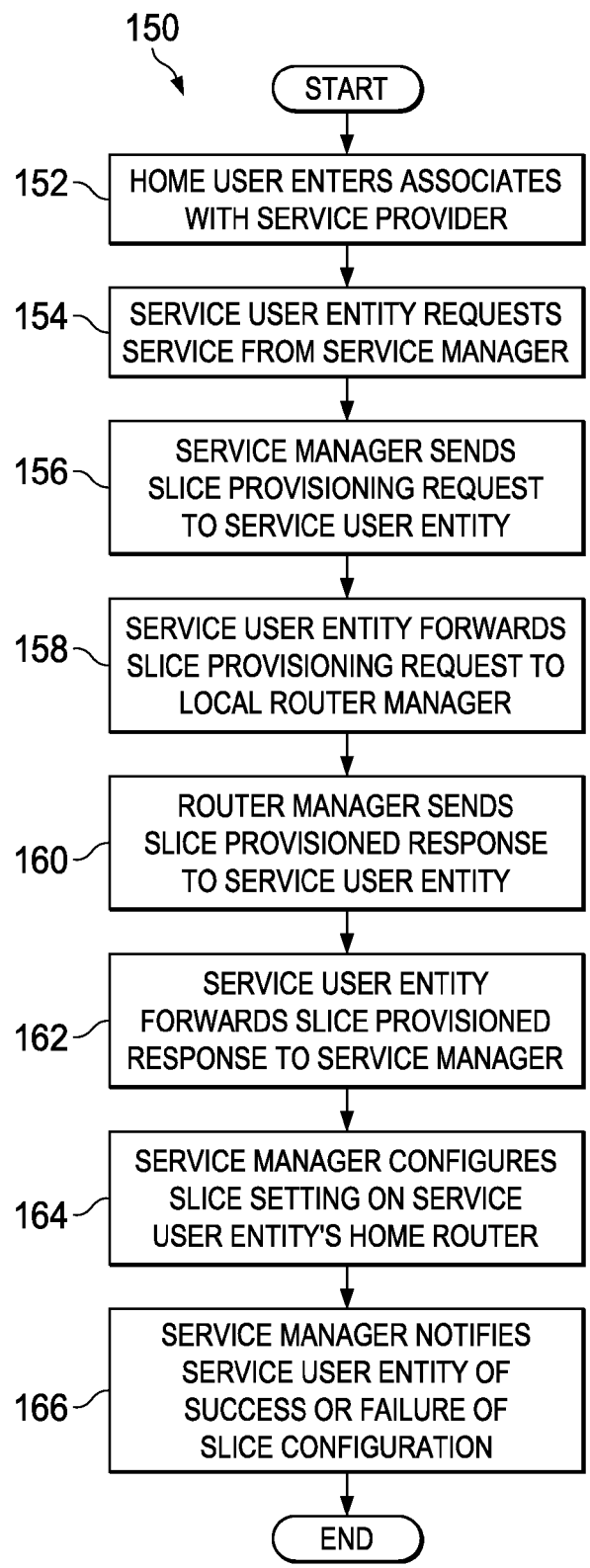
FIG. 10 is a simplified flow diagram illustrating yet other example operations that may be associated with an embodiment of the communication system.

Turning to FIG. 10, FIG. 10 is a simplified flow diagram illustrating example operations 150 that may be associated with embodiments of communication system 10. At 152, the home user may associate with service provider (e.g., by entering into a contract). At 154, service user entity 16 may request a specific service from service manager 14. At 156, service manager 14 may send slice provisioning request 80 to service user entity 16. At 158, service user entity 16 may forward slice provisioning request 80 to local router manager 12. At 160, router manager 12 may send slice provisioned response 86 to service user entity 16. At 162, service user entity 16 may forward slice provisioned response 86 to service manager 14. At 164, service manager 14 may configure the slice settings for the service on home router 50. At 166, service manager 14 may notify service user entity 16 of success or failure of slice configuration.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, router manager 12, service manager 14 and service user entity 16. In some embodiments, one or more of these features may be implemented in hardware, provided external to these elements, or consolidated in any appropriate manner to achieve the intended functionality. The various network elements (e.g., router manager 12, service manager 14 and service user entity 16) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, router manager 12, service manager 14 and service user entity 16 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 58, 66) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processors 56, 64) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at a service manager located in a remote network, router configuration information of a home router located in a home network separate from the remote network, the router configuration information including at least one slice setting for a service deployment at the home router, wherein the router configuration is received after a successful three-way identification, authentication and authorization between the service manager, a service user entity located at the home network, and a router manager, wherein the service user entity controls the home router in the home network, wherein the service manager is associated with a service provider deploying the service, wherein the router manager manages the home router and provides the router configuration information, wherein the service user entity has a pre-existing security association with the router manager; and
   configuring, by the service manager, the slice setting on the home router for the service from the remote network.

2. The method of claim 1, wherein the at least one slice setting logically divides the home router to enable separation of the service from other services provisioned and configured on the home router.

3. The method of claim 1, wherein a plurality of independent service managers can configure separate slices on the home router for distinct services.

4. The method of claim 1, further comprising:
   receiving, at the service manager, a request for the service from the service user entity;
   sending a slice provisioning request to the router manager managing the home router for provisioning the service in the home router; and
   receiving a slice provisioned response comprising the router configuration information from the router manager, wherein the router manager responds with the slice provisioned response if the service user entity authenticates and authorizes the slice provisioning request, wherein the router manager is located remote from the home network.

5. The method of claim 4, wherein the request for the service includes a subscriber identity provided by the router manager with whom the home network has a security association as embodied in keys and a digital certificate on the home router, wherein the slice provisioning request includes interface descriptors for the service, service manager credentials, and subscriber credentials.

6. The method of claim 1, further comprising receiving a slice provisioned response including the router configuration information from the router manager managing the home router, wherein the service user entity requests the service from the router manager, wherein the router manager is remote from the home network.

7. The method of claim 6, wherein the home network's security association with the router manager is embodied in keys and a digital certificate on the home router.

8. The method of claim 1, further comprising:
   receiving a request for the service from the service user entity;
   sending a slice provisioning request to the service user entity; and
   receiving a slice provisioned response including the router configuration information from the service user entity, wherein the service user entity forwards the slice provisioning request to the router manager managing the home router, wherein the router manager responds to the service user entity with the slice provisioned response, wherein the router manager is located in the home network.

9. The method of claim 8, wherein the slice provisioning request includes interface descriptors for the service, service manager credentials, and subscriber credentials.

10. The method of claim 8, further comprising notifying the service user entity of success or failure of the configuration of the home router for the service.

11. Non-transitory tangible media that includes instructions for execution, which when executed by a processor, is operable to perform operations comprising:
    receiving, at a service manager located in a remote network, router configuration information of a home router located in a home network separate from the remote network, the router configuration information including at least one slice setting for a service deployment at the home router, wherein the router configuration is received after a successful three-way identification, authentication and authorization between the service manager, a service user entity located at the home network, and a router manager, wherein the service user entity controls the home router in the home network, wherein the service manager is associated with a service provider deploying the service, wherein the router manager manages the home router and provides the router configuration information, wherein the service user entity has a pre-existing security association with the router manager; and configuring, by the service manager, the slice setting on the home router for the service from the remote network.

12. The media of claim 11, wherein the at least one slice setting logically divides the home router to enable separation of the service from other services provisioned and configured on the home router.

13. The media of claim 11, the operations further comprising:
receiving, at the service manager, a request for the service from the service user entity;
sending a slice provisioning request to the router manager managing the home router for provisioning the service in the home router; and
receiving a slice provisioned response comprising the router configuration information from the router manager, wherein the router manager responds with the slice provisioned response if the service user entity authenticates and authorizes the slice provisioning request, wherein the router manager is located remote from the home network.

14. The media of claim 11, the operations further comprising receiving a slice provisioned response including the router configuration information from the router manager managing the home router, wherein the service user entity requests the service from the router manager, wherein the router manager is remote from the home network.

15. The media of claim 11, the operations further comprising:
receiving a request for the service from the service user entity;
sending a slice provisioning request to the service user entity; and
receiving a slice provisioned response including the router configuration information from the service user entity, wherein the service user entity forwards the slice provisioning request to the router manager managing the home router, wherein the router manager responds to the service user entity with the slice provisioned response, wherein the router manager is located in the home network.

16. An apparatus located in a remote network, comprising:
a memory element for storing data; and
a processor, wherein the processor executes instructions associated with the data, wherein the processor and the memory element cooperate, such that the apparatus is configured as a service manager for:
receiving router configuration information of a home router located in a home network separate from the remote network, the router configuration information including at least one slice setting for a service deployment at the home router, wherein the router configuration is received after a successful three-way identification, authentication and authorization between the service manager, a service user entity located at the home network, and a router manager, wherein the service user entity controls the home router in the home network, wherein the service manager is associated with a service provider deploying the service, wherein the router manager manages the home router and provides the router configuration information, wherein the service user entity has a pre-existing security association with the router manager; and
configuring the slice setting on the home router for the service from the remote network.

17. The apparatus of claim 16, wherein the at least one slice setting logically divides the home router to enable separation of the service from other services provisioned and configured on the home router.

18. The apparatus of claim 16, further configured for:
receiving a request for the service from the service user entity;
sending a slice provisioning request to the router manager managing the home router for provisioning the service in the home router; and
receiving a slice provisioned response comprising the router configuration information from the router manager, wherein the router manager responds with the slice provisioned response if the service user entity authenticates and authorizes the slice provisioning request, wherein the router manager is located remote from the home network.

19. The apparatus of claim 16, further configured for receiving a slice provisioned response including the router configuration information from the router manager managing the home router, wherein the service user entity requests the service from the router manager, wherein the router manager is remote from the home network.

20. The apparatus of claim 16, further configured for:
receiving a request for the service from the service user entity;
sending a slice provisioning request to the service user entity; and
receiving a slice provisioned response including the router configuration information from the service user entity, wherein the service user entity forwards the slice provisioning request to the router manager managing the home router, wherein the router manager responds to the service user entity with the slice provisioned response, wherein the router manager is located in the home network.

* * * * *